(12) United States Patent
Oswald et al.

(10) Patent No.: US 7,841,168 B2
(45) Date of Patent: Nov. 30, 2010

(54) ESTIMATION OF THE TEMPERATURE OF A CATALYTIC CONVERTER AND CORRESPONDING APPLICATIONS

(75) Inventors: Helmut Oswald, Albig (DE); Frank Schwerin, Braunschweig (DE)

(73) Assignee: GM Global Technology Operations, Inc., Detroit, MI (US)

( * ) Notice: Subject to any disclaimer, the term of this patent is extended or adjusted under 35 U.S.C. 154(b) by 972 days.

(21) Appl. No.: 11/570,908

(22) PCT Filed: Jun. 15, 2005

(86) PCT No.: PCT/EP2005/006390
§ 371 (c)(1),
(2), (4) Date: Dec. 19, 2006

(87) PCT Pub. No.: WO2005/124117
PCT Pub. Date: Dec. 29, 2005

(65) Prior Publication Data
US 2008/0302084 A1    Dec. 11, 2008

(30) Foreign Application Priority Data
Jun. 22, 2004    (DE) .................... 10 2004 030 199

(51) Int. Cl.
*F02B 27/04* (2006.01)
*F01N 3/00* (2006.01)
*F01N 3/10* (2006.01)
(52) U.S. Cl. ............... 60/285; 60/273; 60/276; 60/299
(58) Field of Classification Search .......... 60/274, 60/277, 285, 273, 276, 299
See application file for complete search history.

(56) References Cited

U.S. PATENT DOCUMENTS

| | | | | |
|---|---|---|---|---|
| 4,656,829 A | * | 4/1987 | Creps et al. | 60/277 |
| 5,414,994 A | | 5/1995 | Cullen et al. | |
| 5,419,121 A | * | 5/1995 | Sung et al. | 60/274 |
| 5,528,899 A | * | 6/1996 | Ono | 60/276 |
| 5,678,402 A | | 10/1997 | Kitagawa et al. | |
| 6,116,021 A | * | 9/2000 | Schumacher et al. | 60/274 |
| 6,761,023 B1 | * | 7/2004 | Schnaibel et al. | 60/277 |
| 2001/0023584 A1 | * | 9/2001 | Kakuyama et al. | 60/285 |
| 2002/0157380 A1 | | 10/2002 | Kakuyama et al. | |
| 2004/0000135 A1 | * | 1/2004 | Uchida | 60/277 |
| 2004/0045282 A1 | * | 3/2004 | Ide et al. | 60/285 |
| 2004/0055285 A1 | * | 3/2004 | Rohr et al. | 60/295 |
| 2004/0254061 A1 | * | 12/2004 | Dou | 502/71 |

FOREIGN PATENT DOCUMENTS

| | | |
|---|---|---|
| DE | 19907382 | 8/2000 |
| WO | WO 0149987 A1 * | 7/2001 |

* cited by examiner

*Primary Examiner*—Thomas E Denion
*Assistant Examiner*—Audrey Klasterka
(74) *Attorney, Agent, or Firm*—Ingrassia Fisher & Lorenz, P.C.

(57) ABSTRACT

The aim of the invention is to estimate a temperature jump ($\Delta T$) of a catalytic converter of an internal combustion engine in the event of a change in the composition of the exhaust gas. To this end, a quantity of a reactand (SI) stored in the catalytic converter is monitored (2-7), and the heating ($\Delta T$) of the catalytic converter resulting from the reaction heat released during the reaction of the stored reactand is assumed (13, 14, 16, 17) as the temperature jump ($\Delta T$).

13 Claims, 3 Drawing Sheets

ESTIMATION OF THE TEMPERATURE OF A CATALYTIC CONVERTER AND CORRESPONDING APPLICATIONS

CROSS-REFERENCE TO RELATED APPLICATIONS

This application is a U.S. National-Stage entry under 35 U.S.C. §371 based on International Application No. PCT/EP2005/006390, filed Jun. 15, 2005, which was published under PCT Article 21(2) and which claims priority to German Application No. DE 10 2004 030 199.9, filed Jun. 22, 2004.

BACKGROUND

The present invention relates to a method for estimating the temperature of a catalytic converter or possible brief increases in the temperature of the catalytic converter, methods for controlling the mixture supply of an internal combustion engine connected upstream from the catalytic converter, which use the aforementioned methods, and an engine control apparatus for carrying out a method of this type.

An exhaust gas catalytic converter is connected downstream from internal combustion engines of modern motor vehicles, in particular petrol engines, and is used to reduce pollutants contained in the exhaust gas, such as, for example, nitrogen oxides, carbon monoxides and non-combusted hydrocarbons. So that these catalytic converters operate efficiently, they have to be operated at a high temperature and with a stoichiometric air ratio (lambda=1). However, severe aging effects occur in the currently used catalytic converters at temperatures above 950° C. In order to ensure a long service life for the catalytic converters, temperatures which are too high therefore have to be avoided. In other words, the temperature of the catalytic converter must be known and ways have to be known for influencing it.

For cost reasons, the catalytic converter temperature in mass-produced vehicles is not measured, but calculated in an engine control apparatus. A method for this is described in U.S. Pat. No. 5,414,994.

It is known to control the temperature of a catalytic converter of this type by means of the air ratio of the mixture supplied to the engine. By using a rich mixture, the supply of oxygen to the catalytic converter is restricted and as a result of this, less heat is released in the catalytic converter owing to the catalytic oxidation of the remaining hydrocarbons and carbon monoxides contained in the exhaust gas. In addition, the enriching of the mixture reduces the temperature of the exhaust gas supplied to the catalytic converter, as the latter is cooled by the evaporation of the fuel supplied to excess.

Owing to the drawbacks connected therewith regarding fuel consumption and emissions, the aim is to avoid such enriching of the mixture as far as possible.

When the internal combustion engine is operated for a time with a rich mixture, non-combusted hydrocarbons and carbon monoxide collect in the catalytic converter. As soon as only the smallest quantities of oxygen are present in the exhaust gas flow supplied to the catalytic converter, i.e. on transition to a lean mixture, these hydrocarbons are abruptly converted in the catalytic converter and this leads to a corresponding increase in temperature.

Experimentally, during transition from full load operation with a rich mixture ($\lambda=0.9$) after deceleration fuel cut-off, temperature increases of 5 to 30 K were measured within less than 10 ms.

Conversely, the catalytic converter, after deceleration fuel cut-off, is saturated with oxygen within a very short time; it is in a position to store several g thereof. In a subsequent loading with a rich mixture, for example by full load enriching, a still more severe reaction occurs in the catalytic converter.

The calculation method known from U.S. Pat. No. 5,414,994 does not take into account this transient heating. During dynamic driving operation with transitions between a rich and lean mixture, substantial differences may therefore occur between the actual catalytic converter temperature and that calculated with the aid of this conventional calculation model. This fact is conventionally taken into account in that the catalytic converter temperature is controlled to a maximum desired temperature, which is below the critical temperature of, for example, 950° C. with a safety margin of 30 to 50 K. At constant driving at a high load, this restriction of the catalytic temperature leads to a fuel consumption which is higher by about 2 to 5% in comparison to an engine, which is operated with a catalytic converter operating at the critical temperature.

SUMMARY

An object of the present invention is to provide an improved method for estimating the temperature of an exhaust gas catalytic converter for an internal combustion engine.

A further object of the invention is to provide a method for controlling the mixture supply of an internal combustion engine which, with a safety margin from the critical temperature that is reduced in comparison to conventional methods, reliably avoids overheating of the catalytic converter.

This object is achieved by a method that uses a method for influencing the catalytic converter temperature that may be of any known type.

A further object of the invention is to provide a method for estimating possible temperature jumps of the catalytic converter resulting from a change in the exhaust gas composition.

A further object of the invention is to harness the method for estimating the possible temperature jump in the control of the mixture supply of an internal combustion engine to avoid overheating of the catalytic converter.

This object is achieved by a method that contains a safety margin between the critical temperature and the calculated catalytic converter temperature, but this safety margin is variable and takes into account the time-dependent, variable energy quantity, which is contained in the reactand stored in the catalytic converter, so this safety margin can generally be made smaller than in the conventional methods.

The subject of the invention is also an engine control apparatus for an internal combustion engine, which carries out a method as described above.

In a preferred configuration of the methods according to the invention, a reactand, the quantity of which that is stored in the catalytic converter is tracked, is oxygen; in this case, the change in the composition of the exhaust gas, which leads to a sudden heating, is a transition from a lean to a rich mixture. An alternative reactand, the stored quantity of which is tracked, is non-combusted hydrocarbons and carbon monoxide, the quantity of which can be detected jointly, calculated as a hydrocarbon equivalent; in this case, the change in the composition of the exhaust gas, which leads to the sudden heating of the catalytic converter, is a transition from a rich to a lean mixture.

In a simple development of the methods according to the invention, the entire energy contained in the stored reactands is simply assumed to be reaction heat being released within a predetermined timespan.

A further developed configuration takes into account whether, within this predetermined timespan, sufficient complimentary reactands are supplied at all to convert the stored reactands, in that it assumes a converted quantity of the stored reactand proportional to the instantaneous gas throughput of the catalytic converter.

When, in this last configuration, the actually stored quantity is smaller than the theoretically convertible quantity taking into account the exhaust gas throughput, the heating is expediently calculated with the aid of the actually present quantity.

As the desorption behavior and efficiency of the catalytic converter may change in the course of time, in the calculation of the heating, an expression which is dependent on the aging of the catalytic converter is expediently taken into account, which can be determined empirically in advance with a reference catalytic converter.

The stored quantity of the one or other reactand can be tracked in a simple manner by forming the time integral of an expression, which is proportional to $(\lambda-1)$, wherein $\lambda$ is the air ratio of the combustion, and to the gas throughput of the catalytic converter.

This expression is preferably also proportional to a storage factor which depends on the operating history of the catalytic converter. This storage factor, which reflects a saturation of the catalytic converter by the respectively tracked reactand, may be dependent on the air ratio $\lambda$, the gas throughput of the catalytic converter and the timespan, in which rich or lean exhaust gas has been continuously supplied.

A change in the composition of the exhaust gas, which can lead to a sudden heating, can be recognized by a sign change of the expression $(\lambda-1)$. When the integrand of the time integral is determined by a first component of a control apparatus carrying out the method according to the invention and the integral is formed by a second component, this second component does not necessarily have access to the parameter $(\lambda-1)$. Nevertheless, this second component can easily recognize a change in the composition of the exhaust gas by a reversal in the development tendency of the time integral, i.e. when the difference between successively calculated values of the time integral changes its sign.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
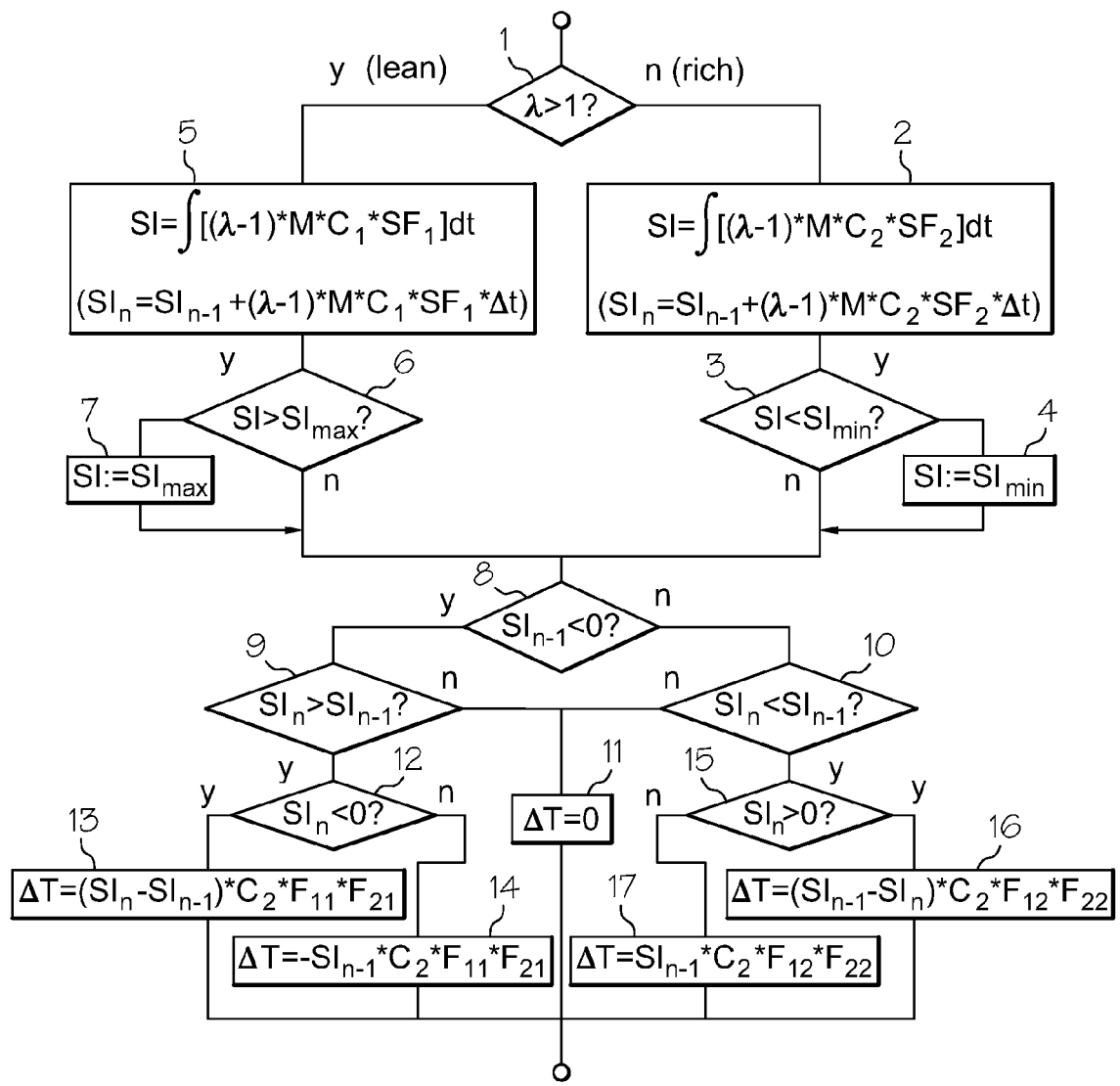
FIG. 1 shows a flowchart of a method for estimating the contribution of storage effects to the temperature of an exhaust gas catalytic converter.

The method shown in FIG. 1 is used to calculate a temperature correction value $\Delta T$, by which a temperature of the catalytic converter calculated in a conventional manner without taking into account storage effects, has to be corrected in order to take account of sudden heatings, which are caused by the fact that during a change of the composition of the mixture supplied to the internal combustion engine from rich to lean or vice versa, a reactand previously stored in the catalytic converter is abruptly converted.

Firstly, it is ascertained in step 1, whether the mixture currently supplied to the internal combustion engine is rich $(\lambda \leq 1)$ or lean $(\lambda > 1)$, i.e. what type the reactand is that is collecting in the catalytic converter.

In the case of a rich mixture, the catalytic converter is supplied with a hydrocarbon equivalent, i.e. non-combusted hydrocarbons and/or carbon monoxide, but oxygen required for their afterburning in the catalytic converter is no longer contained to an adequate extent in the exhaust gas, so the hydrocarbon equivalent collects in the catalytic converter.

A measure of the collected quantity of hydrocarbon equivalent is the storage integral SI, which is calculated in step 2. In general, the storage integral SI is a time integral of the form $$SI = \int (\lambda-1) M\, C_2 SF_2\, dt,$$

wherein M gives the gas throughput of the catalytic converter, C2 is a specific parameter for the hydrocarbon equivalents, which is a measure of their tendency to remain stuck in the catalytic converter and SF2 is a storage factor, which depends on the already stored hydrocarbon or carbon monoxide quantity and as a result thereof, on $\lambda$, the gas throughput M and the time period, during which the engine has continuously been supplied with a rich mixture. (To be precise, the parameter C2 has its own value for each component of the hydrocarbon equivalent, however it is sufficient for the purposes of the invention to work with an average value weighted according to the proportion of the diverse components in the overall hydrocarbon equivalent of the exhaust gas flow.) The storage integral SI is calculated in particular numerically, in that its value SIn is obtained at an instant tn proceeding from its value SIn−1 at a previous instant tn−1 by adding on $(\lambda-1)$ M C2 SF2 $\Delta t$, wherein $\Delta t = tn - tn-1$.

The parameters $C_2$ and $SF_2$ specific to the catalytic converter are assumed to be positive here. As M can only assume positive values and $(\lambda-1)$ is always negative in a rich mixture, the storage integral SI always assumes negative values when hydrocarbons and carbon monoxide are stored in the catalytic converter.

The fact that the storage capacity of the catalytic converter is limited for the hydrocarbons can be taken into account in that a check is made in step 3 whether the (notably negative) storage integral SI has fallen below a value SImin corresponding to the maximum storage capacity and, if this is so, the value of SI is limited to SImin in a step 4.

If it is ascertained in step 1, that the mixture is lean, i.e. an oxygen excess prevails in the exhaust gas, in steps 5, 6, 7, in an analogous manner to that described above for steps 2 to 4, a value of the storage integral SI is determined, which represents a measure of the oxygen quantity stored in the catalytic converter. The substance-specific parameter C1 and the storage factor SF1 generally have a different numerical value here to the corresponding parameters C2, SF2 referring to hydrocarbons. It is also assumed for C1, and SF1 that they are never negative. A positive value of SI can therefore only be obtained under the precondition $(\lambda-1)>0$ and a negative one only when $(\lambda-1)>0$ applies. Therefore, the same variable SI can be used as a measure both for the stored hydrocarbon and carbon monoxide quantity and for the stored oxygen quantity, a positive value being a measure of the stored oxygen quantity and a negative value a measure of the stored quantity of hydrocarbon equivalent. As in the case steps 3, 4 an upward limitation of the storage integral SI, which corresponds to a maximum storable quantity of oxygen, to a value SImax, can be implemented, in that SI is compared with SImax (step 6) and optionally reduced to SImax (step 7).

The parameters C1, SF1, C2 and SF2 may in each case be set as constants, in the scope of a further developed configuration, but also as variables depending on the temperature and/or gas throughflow of the catalytic converter, with it being possible to empirically determine the dependency of the temperature and/or gas throughput in each case on a prototype of the catalytic converter.

In particular in the case of vehicles, which have a catalytic converter diagnosis in the form of a regular determination of the oxygen storage capacity or carbon monoxide/hydrocarbon storage capacity of the catalytic converter, it is expedient to use values derived from the values thus determined for SImin and SImax.

Once the storage integral SI has been calculated, the method branches in step 8 in the case of a negative sign of the storage integral $SI_{n-1}$, to step 9, and in the case of a positive sign, to step 10. In step 9 a check is made as to whether the current value of the storage integral $SI_n$ is greater than the previous $SI_{n-1}$. If not, i.e. if the storage integral has a falling or constant tendency, no afterburning of the stored hydrocarbon can take place and a temperature correction $\Delta T$ resulting from the afterburning is set at equal to 0 in step 11.

If it is ascertained in step 9 that $SI_n > SI_{n-1}$, in other words the amount of the storage integral decreases, a change in the mixture composition from rich to lean must have taken place and the combustion of the hydrocarbon and carbon monoxide stored in the catalytic converter starts. Depending on the value of the gas throughput M, one or more cycles $\Delta t$ may be necessary in order to convert the hydrocarbon store. If the store is not completely converted in a cycle, the method calculates, in step 13, a temperature jump $$\Delta T = (SI_n - SI_{n-1}) C_2 F_{11} F_{21}$$

(wherein F11, F21 are parameters referring to a hydrocarbon equivalent, which may have a temperature dependency taken into account in the model, and of which the one, F11, is dependent on the gas throughput and the other, F21, changes owing to the aging of the catalytic converter).

If the storage integral changes its sign, i.e. if in step 12 $SI_n > 0$, to calculate the temperature jump, $SI_n = 0$ is assumed, i.e. the temperature jump $\Delta T$ is calculated in step 14 according to the following formula $$\Delta T = -SI_{n-1} C_2 F_{11} F_{21}.$$

In a similar manner to step 9, the development tendency of the storage integral is assessed in step 10. If $SI_n > SI_{n-1}$, i.e. if SI is positive with a rising tendency, the quantity of oxygen stored in the catalyst rises, the oxygen is not converted, and the temperature correction in step 11 is consequently set at $\Delta T = 0$. If, however, in step 10 a falling tendency is ascertained, this equates with a change from a lean to a rich mixture, and no reaction with the stored oxygen can take place. The temperature correction is calculated in steps 15, 16, 17 in an analogous manner to in steps 12 to 13 with the aid of analogous formulae:

$$\Delta T = (SI_{n-1} - SI_n) C_2 F_{12} F_{22},$$

if no sign change of SI takes place, and $$\Delta T = SI_{n-1} C_2 F_{12} F_{22},$$

in the event of a sign change.

In this case, F12 and F22 are parameters referring to oxygen, of which the one, F12, depends on the gas throughput and the other, F22, depends on the current aging of the catalytic converter, and which, like F11 and F21, may have a temperature dependency to be taken into account.

In this manner, a measure of the temperature deviation $\Delta T$ is determined between the real temperature of the catalytic converter and a catalytic converter temperature, which is calculated in the conventional manner without taking account storage effects.

Figure 2:
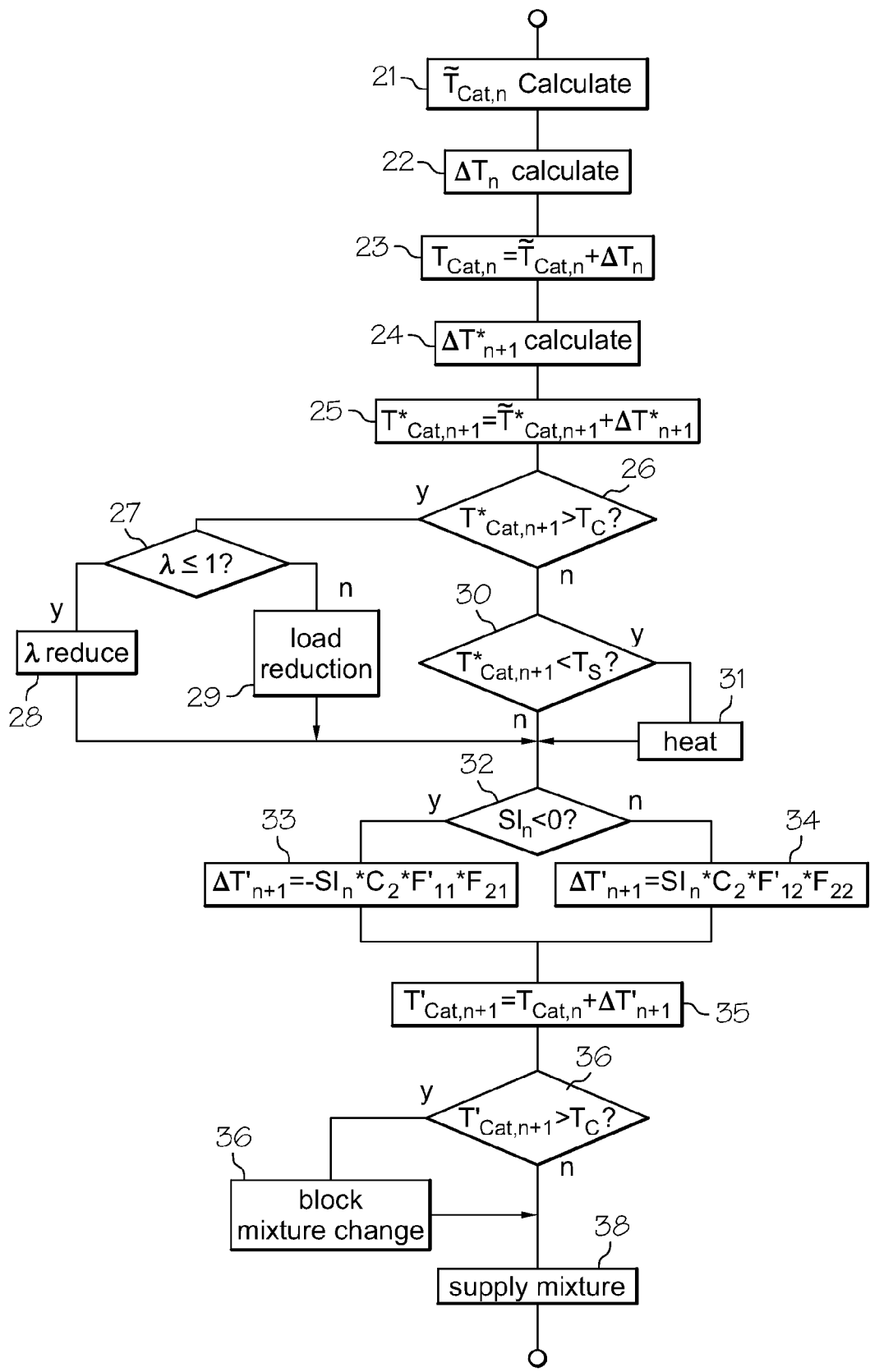
FIG. 2 shows a flowchart for estimating the temperature of an exhaust gas catalytic converter based on the method of FIG. 1 and for controlling the operation of the exhaust gas catalytic converter with the aid of the estimated temperature.

FIG. 2 shows a flowchart of an operating method for a catalytic converter, which is carried out by an electronic engine control apparatus, which method is based on the method from FIG. 1. The method is carried out iteratively. At the instant $t_n$ of the present iteration, the temperature of the catalytic converter $T_{cat,\,n-1}$ at the previous iteration instant $t_{n-1}$ is known from the previous iteration.

The current iteration at the instant tn begins with an estimate value of the catalytic converter temperature $\tilde{T}cat, n$ at the present iteration instant tn being calculated in step 21 according to a conventional method, such as is known, for example, from U.S. Pat. No. 5,414,994, with the aid of the temperature Tcat, n−1 at the previous iteration instant tn−1, of current values of the air ratio $\lambda$ and the exhaust gas throughput M taking into account the heat quantities supplied to and removed from the exhaust gas, of the heat quantity being released by catalytic reactions of the continuously supplied exhaust gas, but without taking into account heat possibly being released during the conversion of stored reactants.

In step 22, a current temperature correction $\Delta T_n$ is determined by the method described with the aid of FIG. 1, also with the aid of the current air ratio $\lambda$ and exhaust gas throughput M and the instantaneous catalytic converter temperature Tcat, n is calculated in step 23 according to the formula $$T_{cat,\,n} = \tilde{T}_{cat,\,n} + \Delta T_n.$$

In step 24, the engine control apparatus ascertains with the aid of a current movement state of the motor vehicle equipped with the engine and the position of the accelerator pedal disclosing a wish of the driver in a next iteration of the method, values to be adjusted of the air ratio $\lambda$ and gas throughput M and calculates an estimated value $\tilde{T}^*cat, n+1$, for these values, of the catalytic converter temperature at the instant tn+1 of the next iteration in a manner analogous to step 21, a temperature correction $\Delta T^*n+1$ to be expected according to the method described with the aid of FIG. 1 and adds the two in step 25 to form a forecast catalytic converter temperature T*cat, n+1:

$$T^*_{cat,\,n+1} = \tilde{T}^*_{cat,\,n+1} + \Delta T^*_{n+1}.$$

In step 26, it is checked whether this temperature T*cat, n+1 exceeds a critical operating temperature of the catalyst, for example 950° C. If so, protective measures 27, 28, 29 are carried out in order to cool the catalyst or avoid its overheating. Basically, any measures known from the prior art to restrict the catalytic converter temperature are suitable. In particular, if in step 27 it is ascertained that the engine has already previously been operated with a rich mixture ($\lambda<1$), an additional enriching can be decided upon (step 28), in order to thus cool the exhaust gas supplied to the catalytic converter. If, conversely, in step 27, it is ascertained, that up to now a lean mixture was supplied, when the catalytic converter temperature approaches the limit temperature, enriching can certainly not be carried out for cooling; instead, in step 29, a reduction in the gas throughput (and therefore the performance of the engine) is decided upon, if necessary against the driver's wish expressed by the accelerator pedal position.

If it is ascertained in step 26, that the critical temperature Tc is not exceeded, a check is made in step 30 as to whether a minimum operating temperature Ts of the catalytic converter is fallen below. If so, in particular in a warm-up phase shortly after the engine has been started, in step 31, suitable measures known per se are decided upon to increase the catalytic converter temperature; if not, the method passes directly to step 32.

In step 32, the sign of the storage integral SI determined previously during the calculation of the current temperature correction $\Delta T_n$ in step 22, is checked. Depending on the sign of the storage integral, i.e. depending on the type of reactant stored in the catalytic converter, a heating $\Delta T'_{n+1}$ of the catalytic converter resulting from the abrupt conversion of this reactant in the quantity given by the storage integral SI is calculated in step 33 or 34. In this case, F'11 or F'12 in each case designate the value of the constants F11, F12, described with reference to FIG. 1, which corresponds to a maximum value of the air throughput M of the internal combustion engine; in other words $\Delta T'$ is the temperature jump, which would be produced with the most rapid possible conversion of the reactand stored at the time tn, and therefore the greatest possible temperature jump for the respective current value of the storage integral SI. As an alternative, the calculation can also be carried out with F11, F12 and the gas throughput M actually to be adjusted in the next iteration.

In step 35, the temperature $$T'_{cat, n} + = T_{cat, n} + \Delta T'_{n+1}$$

is calculated which is the maximum the catalytic converter could reach if the stored reactand in the instantaneous quantity given by the storage integral SI is converted at the greatest possible speed. In step 36 it is checked whether this temperature $T'_{cat, n}$ is above the critical temperature $T_c$. If so, in step 37, a possible conversion of the rich mixture to a lean one or vice versa is blocked to prevent the conversion of the stored reactand.

Instead of Tcat, n, in step 35, T*cat, n+1 can be used.

In step 38, the mixture is supplied with the proportioning decided on in steps 28, 29, 31 or 37.

The method described for the instant tn with the aid of FIG. 2, can be iterated identically in each case at the following instants tn+1, tn+2 etc. Alternatively, if at the nth iteration none of the steps 28, 29, 31 or 37 has been carried out, at the n+1th iteration, the steps 21, 22, 23, in which the current catalytic converter temperature is calculated, can be missed out, as the forecast catalytic temperature T*cat, n+1 obtained in step 25 of the nth iteration is practically identical with the catalytic converter temperature Tcat, n+1, which would be produced in step 23 of the n+1th iteration, if this were to be carried out. Only if correction measures of steps 28, 29, 31 or 37 lead to the fact that the values of the air ratio $\lambda$ and the gas throughput M used in the nth iteration for the prognosis are clearly different than those which were actually adjusted later at the engine, is recalculation of Tcat, n+1 necessary on the basis of these changed values in the n+1th iteration.

In summary, it can be said that while conventional methods for regulating the catalytic converter temperature maintain a safety margin between the calculated catalytic converter temperature and the critical temperature Tc, so the critical temperature Tc is not exceeded even during a brief heating of the catalytic converter resulting from a change in the mixture status from rich to lean or vice versa, the method according to FIG. 2, as a precaution checks the operating conditions of the catalytic converter taking into account a possible brief heating by conversion of stored reactands, as to whether the critical temperature can be maintained and, if this proves to be impossible initially in the planned operating conditions, corrects the operating conditions so that the critical temperature Tc is not exceeded. The maintaining of a rigid safety margin from the critical temperature Tc can therefore be omitted. An enriching of the mixture to protect the catalytic converter, which increases the fuel consumption, only takes place if it is actually inevitable in order to avoid the exceeding of the critical temperature Tc, so the consumption and exhaust gas values of an internal combustion engine controlled according to the invention are improved.

Figure 3:
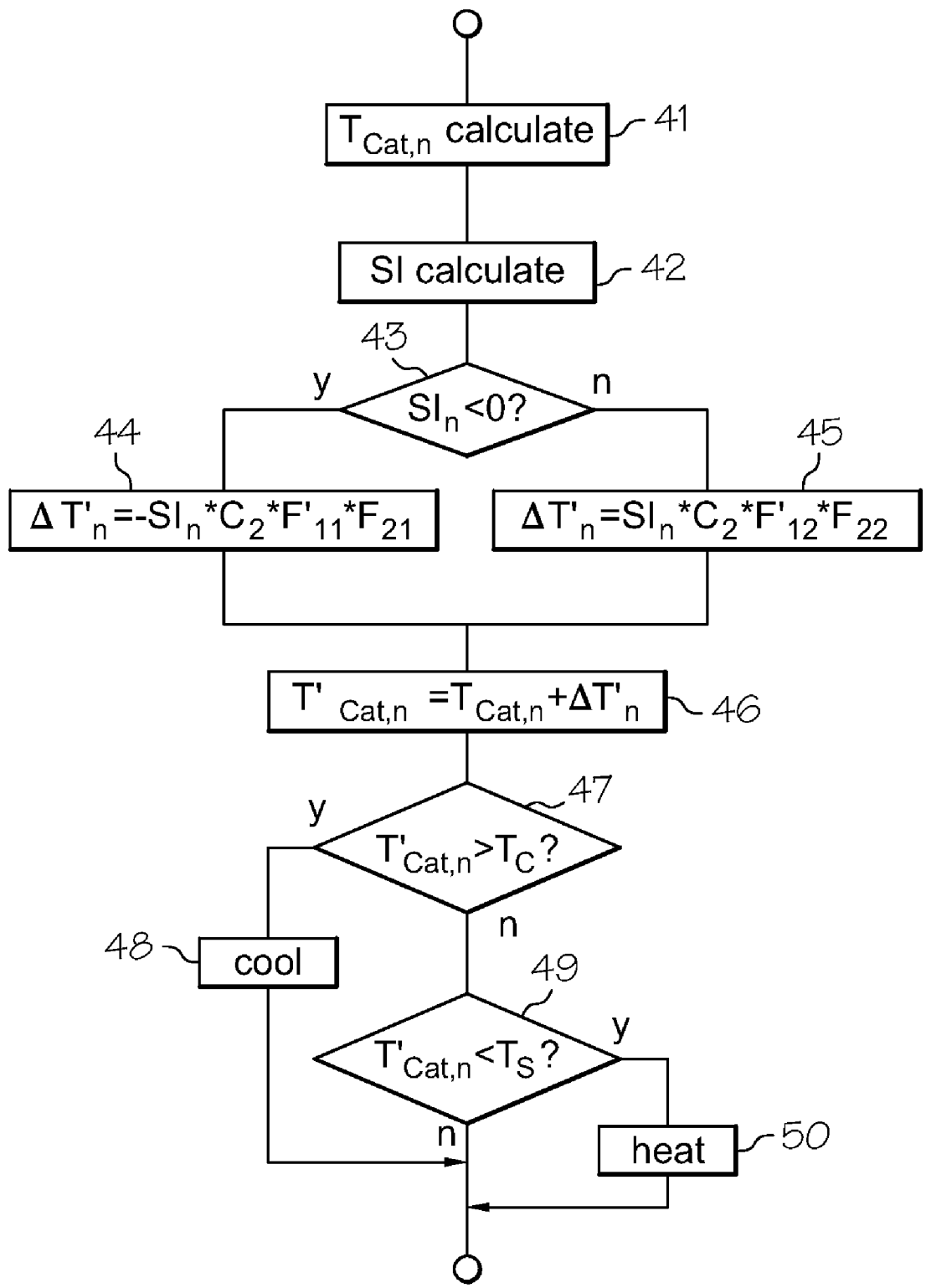
FIG. 3 shows a flowchart of a further method for operating an exhaust gas catalytic converter, which is based on a modification of the method shown in FIG. 1.

A second configuration of an operating method for a catalytic converter according to the invention is described with the aid of FIG. 3. The step 41 is identical with the steps 21 to 23 of FIG. 2. In step 42, the storage integral SI described above is calculated. For this purpose, if necessary, the steps 1 to 7 from FIG. 1 are carried out. The steps 43 to 47 correspond to the steps 32 to 36 described with reference to FIG. 2. If it is ascertained in step 47, that the temperature T'cat, n which can be reached with full conversion of the stored reactand is above the critical temperature Tc, it is checked in step 48, as in step 27 of FIG. 2, whether the combustion up to now was rich or lean. With a rich combustion ($\lambda<1$) up to now, $\lambda$ is further reduced in order to cool the catalytic converter (step 48), and with a lean combustion up to now, the load is reduced (step 49).

In the method of FIG. 3, the conventional safety margin between a calculated catalytic converter temperature Tcat and the critical temperature Tc is not completely abandoned as in the method of FIG. 2, but a variable safety margin $\Delta T'$ is maintained, which corresponds to the temperature increase, which the catalytic converter would undergo if at a given instant, the quantity of a reactand stored in the catalytic converter at this instant were converted at the highest possible speed established by the design of the catalytic converter and the upstream internal combustion engine. This safety margin may be zero if the storage integral is 0.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for estimating the temperature (Tcat) of an exhaust gas catalytic converter for an internal combustion engine, comprising the steps of:

calculating a temperature ($\tilde{T}$cat) of the exhaust gas catalytic converter by using at least the exhaust gas throughput (M) of the catalytic converter and a parameter ($\lambda$) characterizing the composition of the exhaust gas;

tracking a quantity (SI) of a reactand stored in the exhaust gas catalytic converter;

calculating the temperature (Tcat) of the exhaust gas catalytic converter by taking into account the reaction heat being released during the conversion of the stored reactand in the event of a change in composition of the exhaust gas allowing a conversion of the stored reactand;

predetermining a limit temperature ($T_c$);

regulating a mixture supplied to the internal combustion engine such that the temperature (Tcat) remains below the predetermined limit temperature; and calculating a future catalytic converter temperature under an assumption that the mixture is regulated according to a present wish of a driver, and the mixture is regulated deviating from the driver's wish if the future catalytic converter temperature is greater than the limit temperature ($T_c$).

2. The method according to claim 1, wherein complete conversion of the stored reactand is assumed.

3. The method according to claim 1, wherein an expression (F21, F22) depending on the aging of the catalytic converter is entered into the calculation of the reaction heat.

4. The method according to claim 1, wherein the reactand is oxygen and the change in the composition of the exhaust gas is the transition from a lean to a rich mixture.

5. The method according to claim 1, wherein the reactand is hydrocarbon and the change in the composition of the exhaust gas is the transition from a rich to a lean mixture.

6. The method according to claim 1, wherein when the mixture is rich and the present driver's wish corresponds to a lean mixture and the future catalytic converter temperature is greater than the limit temperature (Tc), the mixture is regulated so as to be rich deviating from the driver's wish.

7. The method according to claim 1, wherein when the mixture is lean and the future catalytic converter temperature is greater than the limit temperature (Tc), the mixture is regulated to a smaller throughput than corresponds to the present driver's wish.

8. The method according to claim 1, the conversion of the quantity (SI) of the stored reactand is assumed to be proportional to the instantaneous gas throughput (M) within a predetermined timespan ($\Delta t$).

9. The method according to claim 8, wherein the quantity of the reactand assumed to have been converted is limited by the quantity (SI) of the reactand stored at the beginning of the timespan ($\Delta t$).

10. The method according to claim 1, wherein said tracking the stored quantity (SI) comprises forming the time integral of an expression, which is proportional to a factor, wherein the factor is the air ratio of the combustion, and to the gas throughput (M) of the catalytic converter.

11. The method according to claim 10, wherein the expression is also proportional to a storage factor (SF1, SF2) which is dependent on the operating history of the catalytic converter.

12. The method according to claim 10, wherein the change in the composition of the exhaust gas, which allows a conversion of the stored reactand, is recognized by a reversal of the trend of the time integral.

13. A method for estimating the temperature (Tcat) of an exhaust gas catalytic converter for an internal combustion engine, comprising the steps of:

calculating a temperature ($\hat{T}$cat) of the catalytic converter by using at least the exhaust gas throughput (M) of the catalytic converter and a parameter ($\lambda$) characterizing the composition of the exhaust gas;

tracking a quantity (SI) of a reactand stored in the exhaust gas catalytic converter;

calculating the temperature (Tcat) of the exhaust gas catalytic converter by taking into account the reaction heat being released during the conversion of the stored reactand in the event of a change in composition of the exhaust gas allowing a conversion of the stored reactand;

predetermining a limit temperature ($T_c$);

regulating a mixture supplied to the internal combustion engine such that the temperature (Tcat) remains below the predetermined limit temperature; and calculating a hypothetical catalytic converter temperature (T'cat, n), which would be produced if the reactand stored in the catalytic converter were completely converted, and in that a mixture change is blocked, when it is ascertained, that the hypothetical temperature is above the limit temperature ($T_c$).

* * * * *